(12) United States Patent
Skirbe

(10) Patent No.: US 8,720,380 B1
(45) Date of Patent: May 13, 2014

(54) SINK ENCLOSURE FOR BATHING PETS

(71) Applicant: Frank J. Skirbe, Port Jefferson Station, NY (US)

(72) Inventor: Frank J. Skirbe, Port Jefferson Station, NY (US)

(*) Notice: Subject to any disclaimer, the term of this patent is extended or adjusted under 35 U.S.C. 154(b) by 0 days.

(21) Appl. No.: 13/926,038

(22) Filed: Jun. 25, 2013

Related U.S. Application Data

(60) Provisional application No. 61/666,598, filed on Jun. 29, 2012.

(51) Int. Cl.
*A61D 11/00* (2006.01)
*A47K 3/06* (2006.01)

(52) U.S. Cl.
USPC .............................. 119/600; 119/673; 4/558

(58) Field of Classification Search
CPC ........ A01K 13/001; A61D 11/00; A47K 3/06
USPC ................. 119/600, 601, 651, 671, 673, 753; 4/558, 585
See application file for complete search history.

(56) References Cited

U.S. PATENT DOCUMENTS

| | | | |
|---|---|---|---|
| 3,112,498 A * | 12/1963 | Hoffman ............................ 4/585 |
| 3,749,064 A | 7/1973 | Weinstein et al. |
| 3,793,987 A | 2/1974 | Rogers |
| 4,057,032 A | 11/1977 | Dimitriadis |
| 4,083,328 A | 4/1978 | Baker |
| 4,341,183 A * | 7/1982 | Metzler ......................... 119/671 |
| 5,662,069 A * | 9/1997 | Smith ............................ 119/665 |
| 5,711,252 A * | 1/1998 | Brandolino .................... 119/673 |
| 6,988,467 B1 * | 1/2006 | Smith ............................ 119/675 |
| 7,107,937 B1 * | 9/2006 | Anderson ...................... 119/671 |
| 7,921,812 B1 * | 4/2011 | Carrillo ......................... 119/604 |
| 8,061,301 B1 | 11/2011 | Tsengas |
| 8,069,821 B1 * | 12/2011 | Green ........................... 119/671 |
| D690,060 S * | 9/2013 | Dombey ...................... D30/199 |
| 2007/0074674 A1 * | 4/2007 | Miller ........................... 119/671 |
| 2007/0289548 A1 * | 12/2007 | Smoot ........................... 119/668 |
| 2010/0300367 A1 * | 12/2010 | Askinasi ....................... 119/161 |
| 2011/0083613 A1 | 4/2011 | Redick |

* cited by examiner

*Primary Examiner* — Yvonne Abbott
(74) *Attorney, Agent, or Firm* — Sturm & Fix LLP

(57) ABSTRACT

The present invention provides a sink enclosure for bathing pets that provides a safe environment for such bathing. The sink enclosure is composed of a number of vertical posts which support a heavy duty vinyl panel that extends around the sink and withstand water flow, spray, and pet nail penetration. An adjustable front access panel allows the pet owner easy access to the pet within the enclosure. The sink enclosure provides a water barrier and pet restraint. The invention adapts to any size sinks and configuration, and is highly durable and adds a high level of safety for both the animal and the bather. The enclosure is easy and fast to put up and take down, usually within a few minutes.

11 Claims, 4 Drawing Sheets

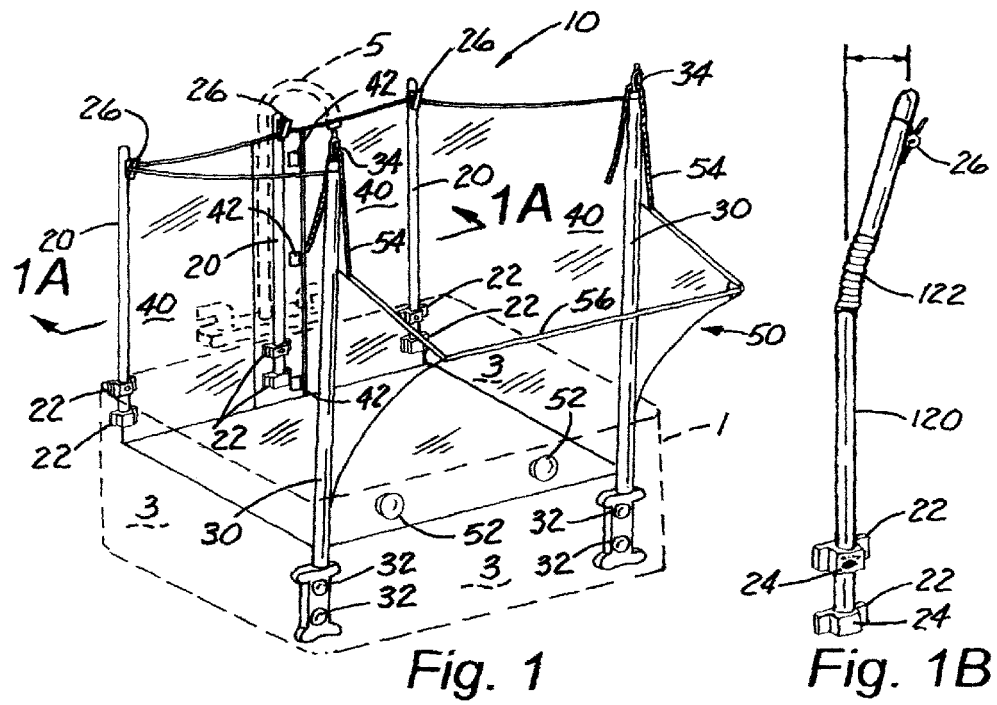
Fig. 1
Fig. 1B
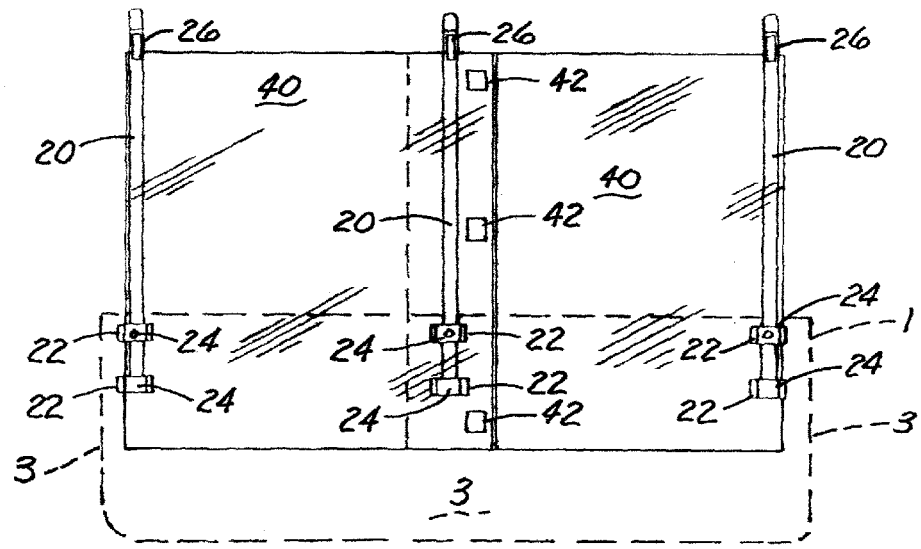
Fig. 1A

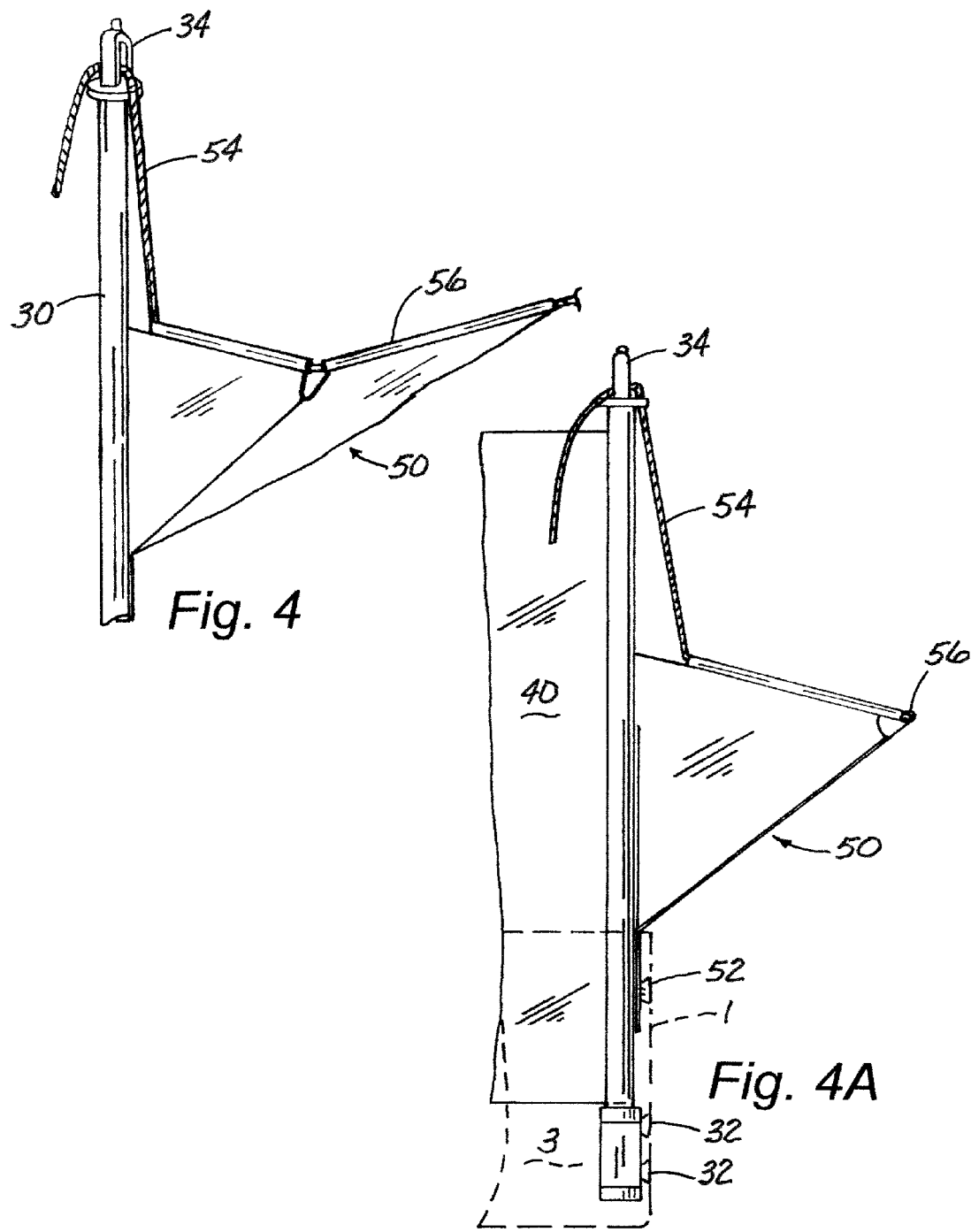

SINK ENCLOSURE FOR BATHING PETS

CROSS REFERENCE TO RELATED APPLICATIONS

This application claims the benefit of U.S. Provisional Patent Application Ser. No. 61/666,598 filed Jun. 29, 2012 entitled ""Sink Enclosure for Bathing Pets" which is incorporated herein by reference.

BACKGROUND OF THE INVENTION

1. Field of the Invention

The present invention relates to the field of pet care devices, and more particularly to a sink enclosure for bathing pets.

It is a well known fact that many pet owners wash their small to medium sized pets in a kitchen sink. Not only does this create a watery mess which can damage kitchen counters, floor areas, as well as soil the surrounding window coverings with dirty water stains, it creates an unsafe condition for the animal. The pet, even if restrained, can injure itself seeking to jump out of the sink. It is possible for a dog to jump out of the sink and having wet feet, can actually break its leg or legs.

Many pet owners wash their animals in the bathtub, or in the stall shower. Many disadvantages to this method are lacking control of the pet, allowing the pet to jump out of the tub when soaking wet to run through the living area shaking water all over furniture, carpet, and at the same time the pet could harm themselves by slipping on the floor. Bathing in an area like a bathtub or shower creates a stressful, high anxiety washing environment for the pet. Once a pet knows what is coming with washing in the tub or shower, the pet is in a state of high anxiety.

Bathing a pet in a tub means the owner must lean over the tub and put stress on their back and possibly bring on some injury. If an owner prefers to wash the pet in the stall shower, the owner must get in the shower with the pet. Not only does the animal get stressed, but the owner is also stressed. The animal could jump on the owner and cause serious harm to both itself and the owner.

As a consequence of the foregoing situation, there has existed a longstanding need for a new and improved enclosure for a sink for bathing pets, and the provision of such a device is a stated object of the present invention.

2. Description of Related Art

As can be seen by reference to the following U.S. Pat. Nos. 3,749,064; 3,793,987; 4,057,032; 4,083,328; 8,061,301; and U.S. Publn. 20110083613, the prior art is replete with myriad and diverse pet bathing devices.

While all of the aforementioned prior art constructions are adequate for the basic purpose and function for which they have been specifically designed, they are uniformly deficient with respect to their failure to provide a simple, efficient, and practical device for bathing pets in a sink.

As a consequence of the foregoing situation, there has existed a longstanding need for a new and improved, sink enclosure for bathing pets, and the provision of such a device is a stated object of the present invention.

BRIEF SUMMARY OF THE INVENTION

Briefly stated, the present invention provides a sink enclosure for bathing pets that provides a safe environment for such bathing. The sink enclosure is composed of a number of vertical posts which support a heavy duty vinyl panel that extends around the sink and withstand water flow, spray, and pet nail penetration. An adjustable front access panel allows the pet owner easy access to the pet within the enclosure. The sink enclosure provides a water barrier and pet restraint. The invention adapts to any size sinks and configuration, and is highly durable and adds a high level of safety for both the animal and the bather. The enclosure is easy and fast to put up and take down, usually within a few minutes.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with drawings, wherein:

FIG. 1 is a perspective view of the sink enclosure for bathing pets of the present invention, with a dashed line showing a sink to which the enclosure is attached;

FIG. 1A is a rear elevational sectional view of the sink enclosure taken along line 1A-1A of FIG. 1;

FIG. 1B is a perspective view of an alternate embodiment of the rear vertical post showing the flexibility of the upper portion of the post;

FIG. 4 is a partial left side perspective view of the front post showing the cord adjustment attached to the adjustable front access panel; and FIG. 4A is a partial left side elevational view of the front post showing the cord adjustment secured by the cord stop to secure the adjustable front access panel in a selected position.

DETAILED DESCRIPTION OF THE INVENTION

As can be seen by reference to the drawings, and in particular to FIG. 1, the sink enclosure for bathing pets in a sink that forms the basis of the present invention is designated generally by the reference to number 10.

Figure 2:
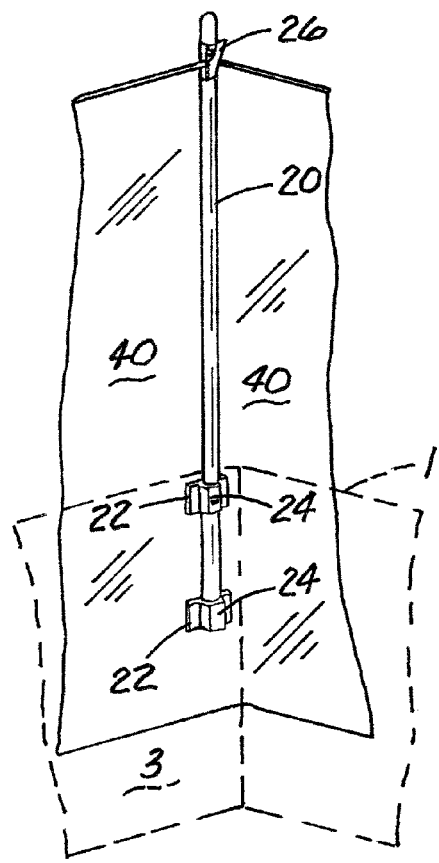
FIG. 2 is a partial perspective view showing one of the posts releasably attached at a vertical face of the sink.
Figure 2A:
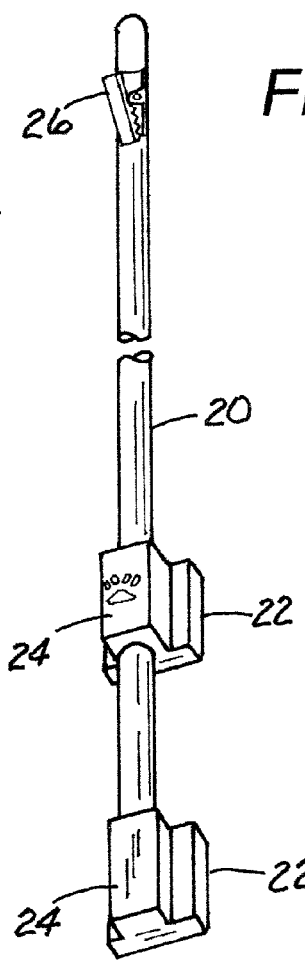
FIG. 2A is an enlarged perspective view of the post showing the panel clamp carried on a top portion thereof.
Figure 2C:
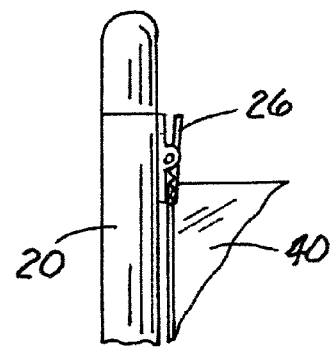
FIG. 2C is an enlarged partial side elevational view of the panel clamping device.
Figure 2B:
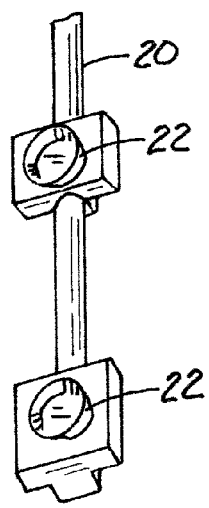
FIG. 2B is a partial perspective view of the post showing the suction cups carried on a lower portion thereof for releasable attachment to the vertical face of the sink.

Referring now to FIGS. 1 and 1A, three vertical fiberglass posts 20 are shown releasably attached to a rear vertical face 3 of a sink 1. As best shown in FIGS. 2A-2C, attached to each of these three posts 20 are a pair of suction cups 22 secured by screws 24 to a lower portion of the post 10. An upper portion of each post 20 carries a panel clamp 26.

FIG. 1B shows an alternate embodiment where the vertical post 120 has a deformable section 122 located between the suction cups 22 and the panel clamps 26.

The post 120 allows the flexibility of adjusting the posts in any shape, including creating a canopy to accommodate any kitchen sinks that have cabinets overhanging the kitchen sink, which is a nonflexible post 20 could not accommodate.

Figure 3:
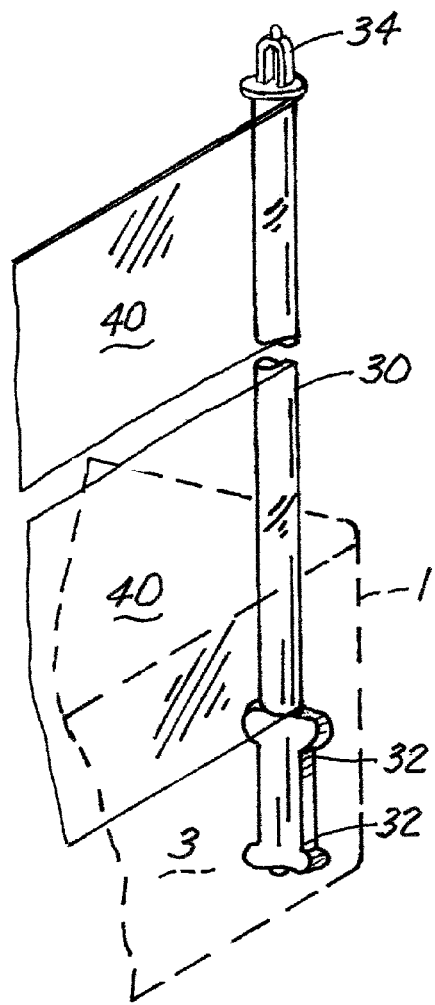
FIG. 3 is a partial perspective view of one of the front posts that has the attached vinyl panel extending back to the rear vertical posts.
Figure 3A:
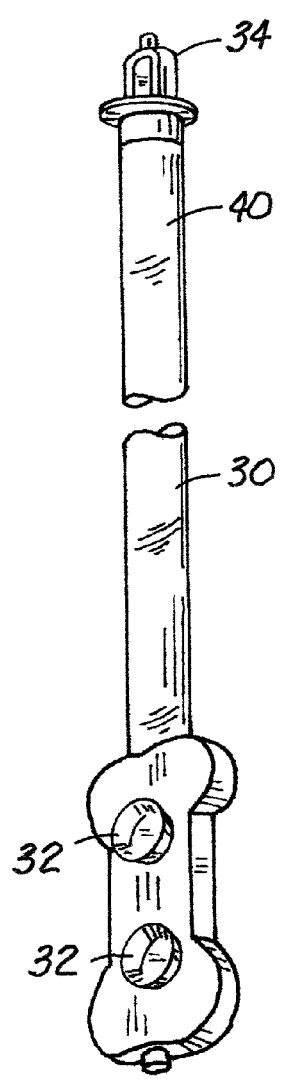
FIG. 3A is an enlarged rear perspective view of the front post showing the suction cups carried on a lower portion and a cord stop carried on a top portion thereof.
Figure 3B:
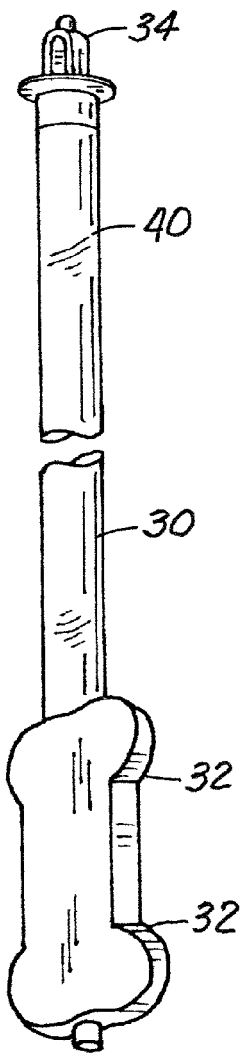
FIG. 3B is an enlarged front perspective view thereof.

FIGS. 1 and 3-3B show the front posts 30 having a pair of spaced suction cups 32 carried at a lower portion of each post 30 and a cord stop 34 carried on the top portion. A flexible vinyl panel 40 is wrapped around the post 30 at a middle portion thereof. As shown in FIG. 1, the flexible panel 40 is extended back to be secured by the panel clamps 26. The panels 40 extending back from the left and right front posts 30 overlap at the rear (FIG. 1A) and are secured together by hook and loop fasteners 42.

As shown in FIGS. 1 and 4-4A, an adjustable front access panel 50 has a bottom portion secured to the front vertical face 3 of the sink 1 by suction cups 52. A top portion of the access panel 50 is secured to the top of each of the front posts 30 by a cord 54 that interconnects the top portion of the access panel 50 and the cord stop 34. A Rigid horizontal rod 56 is carried in the top portion of the access panel 50. When the pet is standing with it's front legs on the inside of the access panel 50, the top portion of the panel 50 is pulled down several inches. Thus, the pet owner has greater access to the pet while providing a sufficiently high water barrier and pet restraint.

In use, the user presses the three rear posts 20 with the suction cups 22 close to the top edge of the sink face 3, to space the posts 20 at the rear left, rear center, rear right. The front left and right side posts 30 are attached to the sink face 3 with cups 32 near the bottom of the sink face 3 placed at a slight angle leaning the rod forward.

The vinyl panel 40 is then extended out from both left and right posts 30 to where they meet at the center rear post 20 while panel 40 conforms to the face 3 of the sink 1. Using the attached panel clamps 26, the upper portion of the panel 40 is attached and secured to the posts 26 and the overlapping portion of the panel 40 are secured by hook and loop fasteners 42. If needed to accommodate the water faucet, a slit may be cut in the rear of the panel 40 so the faucets can extend through into the enclosure 20.

The front access panel 50 is then unfolded and secured by the cord 54 through cord 34 on top of each front post 30. The access panel 50 is then slid behind both front posts 30 and the suction cups 52 the bottom of the access panel 50 are attached to the sink face 3. The user is now ready to bathe the animal.

Before placing the pet in the sink, make sure the water temperature has already been tested to see if it is in the comfort range for washing.

Place the pet in the sink without any running water. Let it get comfortable in the enclosed area first. More than likely, the pet will attempt to stand on the front access panel 50, which is what you want it to do.

Once the pet is standing on the panel 50, take the water source and spray the rear portion of the pet, hind legs/feet, buttocks, tummy etc. This is the gradualist approach and is effective against the pet getting nervous and panicky. A light, wide spray on the pet will do wonders to maintain composure and make washing of the pet easy and fun. Do not at this time do any portion of the head, around the eyes and mouth, this will be done much later, for in so doing, the pet will remain comfortable and composed. During this process, the pet is accepting the user's initiatives and its' wash surrounds. Continue to gently place water going from the rear and gradually moving to the upper portion of the pet to it's neck.

Once the pet's body is saturated with water (except the head down to it's neck) place the shampoo on the rear portion and gradually work up to the neck area. Most likely, the pet will be standing on the access panel 50 so the user will have excellent access to wash the rear, tummy and rear paws, in fact, most of the body except the head area.

Continue shampooing the entire pet, all areas except for the head. It is at this stage in the washing cycle, the bather can maximize the time spent shampooing to create a whole new sense of comfort and relaxation for the pet. Because of the front access panel 50, the bather has the ability to create a spa like environment for the pet. With no water pounding on the pet's head and having clear access to the entire body, the bather can institute massage therapy that enhances the pet's health and well being. A number of massage techniques can be institute that enhances the overall health of the pet. In addition, the bather's creating a function where the pet will be more receptive to future washes. A chore now becomes a welcome enhancement activity for the well being of the pet.

After massage therapy, rinse all the shampoo out of the hair.

Once the body is finished, the pet now should be comfortable with the whole process so the bather can apply a gentle spray of water and shampoo on the entire head, even while the pet is standing in the enclosure 10. By this time, the pet should be relaxed and accept initiatives. Never leave the pet unattended during any phases of the wash.

A final rinsing should be done over the entire body to make sure no shampoo and/or conditioner remains on the skin.

Towel dry the entire body, particularly make sure the inner ears have been thoroughly dried.

Now the pet has been treated to a whole new way of bathing which provides a comfortable washing environment, both for the user and the pet.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. An enclosure for bathing pets in a sink having a vertical face, comprising:
   a plurality of posts releasably attached to and spaced around the vertical face of the sink;
   a vertical panel attached to a front group of selected posts of the plurality of posts and disposed to extend upwardly from the vertical face of the sink; and
   an access panel attached to a second group of selected posts of the plurality of posts and being disposed to extend upwardly and outwardly from a front portion of the vertical face of the sink, the access panel including a top edge adjustably attached to the second group of selected posts.

2. The enclosure of claim 1, wherein each of the first group of selected posts includes a first pair of spaced suction cups carried on a lower portion thereof, and a panel clamp carried on an upper portion thereof.

3. The enclosure of claim 2, wherein the first pair of suction cups releasably attach each of the first group of selected posts to the vertical face of the sink.

4. The enclosure of claim 2, wherein the panel clamps engage and releasably support the vertical panel at the upper portion of each of the first group of selected posts.

5. The enclosure of claim 1, wherein the vertical panel is formed of a flexible plastic sheet.

6. The enclosure of claim 5, wherein each of the second group of selected posts includes a second pair of spaced suction cups carried on a lower portion thereof, a cord stop carried on an upper portion thereof, and the flexible sheet attached to and wrapped around an intermediate portion thereof.

7. The enclosure of claim 6, wherein the second pair of suction cups releasably attach each of the second group of selected posts to the vertical face of the sink.

8. The enclosure of claim 6, wherein the flexible sheet is disposed to extend back from each of the second group of selected posts to the first group of selected posts.

9. The enclosure of claim 6, wherein the top edge of the access panel is adjustably supported by a cord that interconnects the top edge of the access panel and the cord stop carried on the upper portion of each of the second group of selected posts.

10. The enclosure of claim 1, wherein the access panel includes a lower portion attached to the front portion of the vertical face of the sink.

11. The enclosure of claim 10, wherein the access panel is releasably attached to the vertical face by suction cups.

\* \* \* \* \*